Oct. 16, 1962  O. A. MEYKAR  3,059,165
SERIES DIODE STACK WITH SURGE PROTECTION
Filed Aug. 13, 1959  2 Sheets-Sheet 1

WITNESSES
Edwin E. Bassler
James F. Young

INVENTOR
Orest A. Meykar
BY
F. E. Browder
ATTORNEY

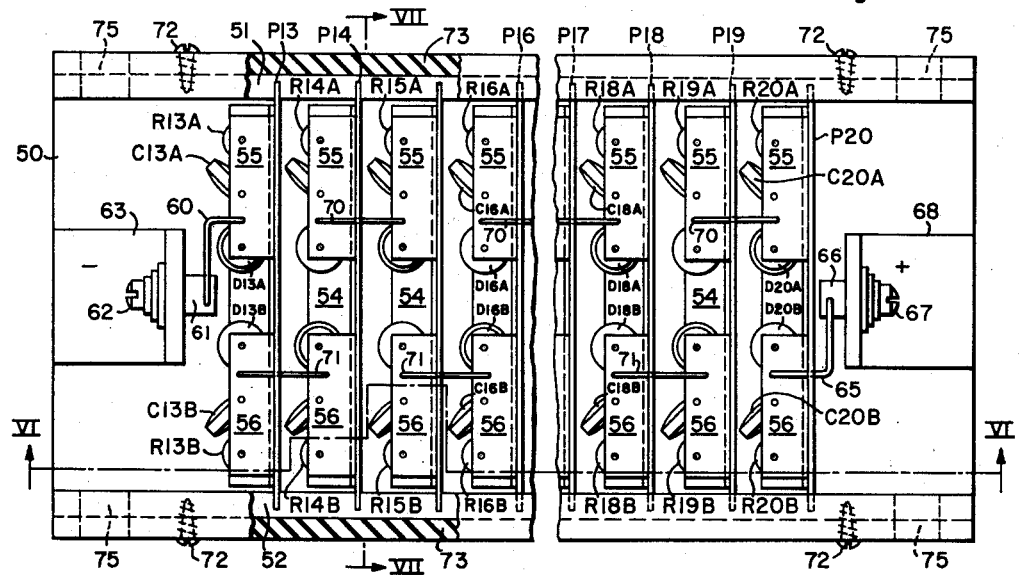

United States Patent Office 3,059,165
Patented Oct. 16, 1962

3,059,165
SERIES DIODE STACK WITH SURGE PROTECTION
Orest A. Meykar, Swarthmore, Pa., assignor to Westinghouse Electric Corporation, East Pittsburgh, Pa., a corporation of Pennsylvania
Filed Aug. 13, 1959, Ser. No. 833,456
7 Claims. (Cl. 321—8)

This invention relates to assemblies of series-connected semiconductor rectifiers.

Operation of semiconductor diodes such, for example, as silicon diodes, requires the addition of protective devices to prevent occurrence of destructive surges. Such protective devices are usually capacitors and resistors connected in parallel with the diodes.

A feature of this invention is that each diode of such an assembly, and its protective device or devices, are formed as a module. Such modules can easily be stacked to form a compact assembly, and connected in series with the terminals of the assembly.

In one embodiment of this invention, each module includes one diode and its surge protective capacitor and resistor. The module has two transversely spaced-apart blocks of electrical insulation through which extend upper and lower plates of electrical insulation. Upper and lower bus plates of metal are attached to the upper and lower plates respectively of insulation. Between the metal bus plates are a diode, a capacitor and a resistor with their terminals connected to the bus plates. The blocks have side recesses for a pair of clamping rods. The blocks are assembled in two parallel rows, the clamping rods are inserted in the recesses in the blocks, and the blocks clamped by the rods to frame ends, following which the bus plates are connected in series to terminals on the frame ends.

In another embodiment of this invention, each module includes two diodes and their surge restraining capacitors and resistors. A U-shaped frame of electrical insulation has longitudinally spaced-apart, transverse slots in the tops of its legs. Each module includes a plate of electrical insulation to which are attached metal bus straps to which are attached the terminals of two oppositely poled diodes and their surge restraining capacitors and resistors, the bus straps connecting the two diodes and their parallel connected capacitors and resistors in series. The modules are assembled in the frame by inserting the insulating plates in the slots in the frame legs, being secured thereto by clamps of electrical insulation. The pairs of diodes and their parallel connected capacitors and resistors, are connected in series to terminals on the ends of the frame.

These modular assemblies provide good electrical insulation, good heat dissipation, ease of assembly, inspection and maintenance, and low manufacturing costs.

An object of this invention is to assemble semiconductor diodes and their parallel connected, surge restraining capacitors and resistors as modules.

Other objects of this invention are to increase the electrical insulation of, the heat dissipation of, and to reduce the size of, and the cost of, series-connected, semiconductor diodes.

This invention will now be described with reference to the annexed drawings, of which:

FIG. 5 is a fragmentary top plan view, partially in section, of another rectifier assembly embodying this invention;

FIG. 6 is a section along the line VI—VI of FIG. 5;

FIG. 7 is a section along the line VII—VII of FIG. 5;

FIG. 8 is an end view of the assembly of FIGS. 5 and 6; and

FIG. 9 is a simplified circuit schematic of the assembly of FIGS. 5 and 6.

Figure 1:
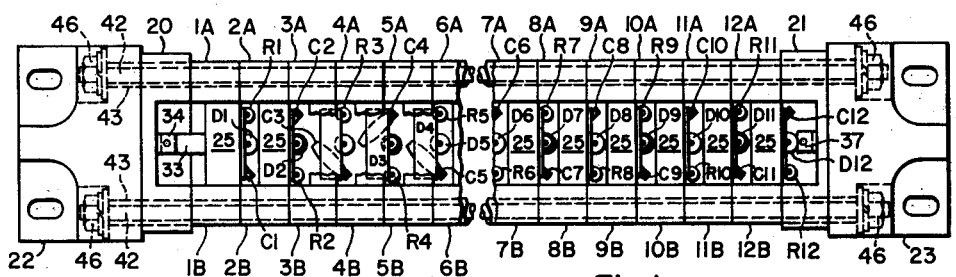
FIG. 1 is a fragmentary, top plan view of a rectifier assembly embodying this invention.

Referring first to FIGS. 1-4, each module includes a pair of transversely spaced-apart blocks of electrical insulation, blocks 1A and 1B being end module blocks at one end of the assembly, and blocks 12A and 12B being end module blocks at the other end of the assembly. Between the end blocks are module blocks 2A—2B, 3A—3B, 4A—4B, 5A—5B, 6A—6B, 7A—7B, 8A—8B, 9A—9B, 10A—10B and 11A—11B. The blocks having A suffixes are transversely opposite and spaced-apart from correspondingly numbered blocks having B suffixes.

Upper and lower plates 25 and 26 respectively, of electrical insulation extend transversely through the blocks of each pair. Attached to the lower and upper surfaces of the plates 25 and 26 respectively, in the spaces between the blocks of each pair, are metal bus plates 27 and 28 respectively. Extending between, with their terminals connected to the bus plates 27 and 28 of the blocks 1A—1B are diode D1, capacitor C1 and resistor R1. Extending between, with their terminals connected to the bus plates 27 and 28 of the blocks 2A—2B are diode D2, capacitor C2 and resistor R2. Extending between, with their terminals connected to the bus plates 27 and 28 of the blocks 3A—3B are diode D3, capacitor C3 and resistor R3. Extending between, with their terminals connected to the bus plates 27 and 28 of the blocks 4A—4B are diode D4, capacitor C4 and resistor R4. Extending between, with their terminals connected to the bus plates 27 and 28 of the blocks 5A—5B are diode D5, capacitor C5 and resistor R5. Extending between, with their terminals connected to the bus plates 27 and 28 of the blocks 6A—6B are diode D6, capacitor C6 and resistor R6. Extending between, with their terminals connected to the bus plates 27 and 28 of the blocks 7A—7B are diode D7, capacitor C7 and resistor R7. Extending between, with their terminals connected to the bus plates 27 and 28 of the blocks 8A—8B are diode D8, capacitor C8 and resistor R8. Extending between, with their terminals connected to the bus plates 27 and 28 of the blocks 9A—9B are diode D9, capacitor C9 and resistor R9. Extending between, with their terminals connected to the bus plates 27 and 28 of the blocks 10A—10B are diode D10, capacitor C10 and resistor R10. Extending between, with their terminals connected to the bus plates 27 and 28 of the blocks 11A—11B are diode D11, capacitor C11 and resistor R11. Extending between, with their terminals connected to the bus plates 27 and 28 of the blocks 12A—12B are diode D12, capacitor C12 and resistor R12. Alternate diodes are inverted so that they have opposite polarities where connected to the bus plates 27 and 28.

The module blocks extend in two rows between frame blocks 20 and 21 of electrical insulation on frame end brackets 22 and 23 respectively, of electrical insulation. The module blocks have recesses 40 in their outer sides. Metal rods 42 within tubes 43 of electrical insulation, extend through the recesses 40 and through aligned circular openings in the frame end blocks 20 and 21, and the frame end brackets 22 and 23. The rods 42 have threaded ends on which nuts 46 are threaded for clamping the module blocks between the frame end brackets.

Figure 2:
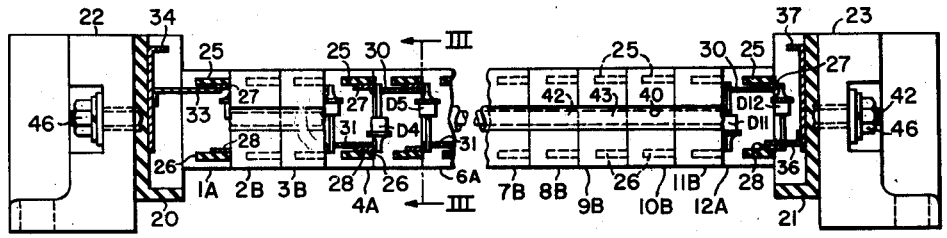
FIG. 2 is a fragmentary side view, partially in section, of the assembly of FIG. 1.
Figure 3:
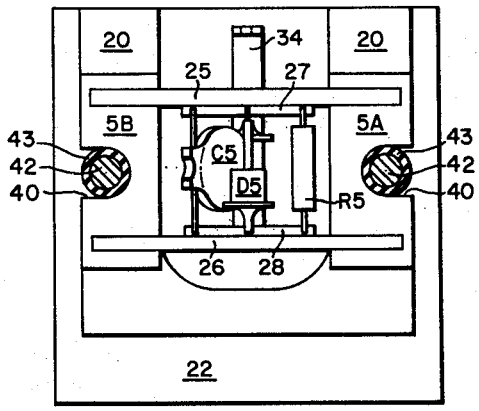
FIG. 3 is a section along the line III—III of FIG. 2.
Figure 4:
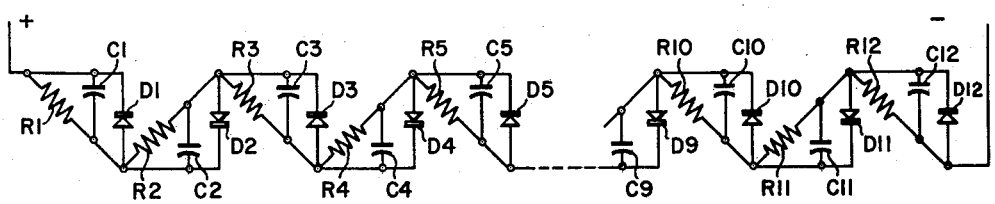
FIG. 4 is a simplified circuit schematic of the assembly.

The bus plates 27 and 28 are connected in series by conductors 30 and 31 respectively, an upper conductor 30 alternating with a lower conductor 31 as shown by FIG. 2. The bus plate 27 of the module blocks 1A—1B is connected by a conductor 33 to a terminal 34 on the end block 20, and the bus plate 28 of the module blocks 12A—12B is connected by conductor 36 to a terminal 37 on the end block 21.

The embodiment of FIGS. 1–4 is particularly suited for air cooling.

Referring now to FIGS. 5–9, a frame 50 U-shaped in section, has vertically extending legs 51 and 52 with transverse slots therein through which extend plates P13—P20 of electrical insulation. Each of such plates has attached thereto, near and parallel to the flat bottom of the frame, a metal bus strap 54 which extends from adjacent to the leg 51 to adjacent to the leg 52. Each of the plates P13—P20 also has attached thereto, near and adjacent to the tops of the legs 51 and 52, transversely aligned and spaced-apart, metal bus straps 55 and 56 which are parallel to the strap 54.

Semiconductor diodes D13A—D20A, and their parallel connected, capacitors C13A—C20A respectively, and resistors R13A—R20A respectively, are supported between, with their terminals attached to, the bus straps 54 and 55 on the plates P13—P20 respectively. Semiconductor diodes D13B—D20B and their parallel connected capacitors C13B—C20B respectively, and resistors R13B—R20B respectively, are supported between, with their terminals attached to, the bus straps 54 and 56 on the plates P13—P20 respectively. The positive terminals of the diodes D13A—D20A are connected to the plate 54, and the negative terminals of the diodes D13B—D20B are connected to the plates 54 so that the diodes of each pair are connected in series by the straps 54.

The strap 55 on the plate P13 is connected by conductor 60 to terminal 61 which is clamped by screw 62 to one end bracket 63 of the frame. The strap 56 on the plate P20 is connected by conductor 65 to terminal 66 which is clamped by screw 67 to the other end bracket 68 of the frame. The pairs of diodes are connected in series by conductors 70 which connect the straps 55 on plates P14 and P15, which connect the straps 55 on plate P16 and on the adjacent plate, not shown, to the right on FIG. 1, of the plate P16, which connect the straps 55 on plate P18 and on the adjacent plate, not shown, to the left of P18, and the straps 55 on the plates P19 and P20, and by conductors 71 which connect the straps 56 on the plates P13 and P14, which connect the straps 56 on the plates P15 and P16, and which connect the straps 56 on the plates P18 and P19.

Each of the plates P13—P20 is seen to be an element of a module which includes the bus straps 54, 55 and 56 on a plate, the pair of oppositely poled diodes on a plate, and the parallel-connected capacitors and resistors of the two diodes on a plate, all of such electrical components being supported on a plate and being insertable and removable with a plate from the frame.

The plates P13—P20 after being inserted in the slots in the legs 51 and 52 of the frame 50, are clamped to the frame by clamps 73 of electrical insulation which are secured to the legs 51 and 52 by screws 72.

Circular holes 75 in clamps 73 and frame 50 are for receiving bolts used for mounting the frame. Circular holes 76 are provided in the plates P13—P20, and circular holes 77 are provided in the bottom of the frame 50 for the passage of cooling fluid.

The embodiment of FIGS. 5–9 can be used for air cooling, or for use in an insulating coolant such as transformer oil or inerteen.

What is claimed is:

1. A rectifier assembly comprising a frame of electrical insulation, a plurality of parallel plates of electrical insulation supported by said frame and extending in alignment transversely of said frame and spaced apart longitudinally of said frame, each of said plates having a first metal bus attached to one side thereof and extending adjacent to one transverse edge of the plate, having second and third, transversely aligned and spaced apart metal busses attached to said one plate side and extending adjacent to the opposite transverse edge of the plate, each plate having a first semiconductor diode, a first capacitor and a first resistor extending between with their terminals connected to said first and second busses so as to be supported by and connected in parallel by said first and second busses, said first diode having a terminal of one polarity connected to said first bus, each plate having a second semiconductor diode, a second capacitor and a second resistor extending between said first and third busses so as to be supported by and connected in parallel by said first and third busses, said second diode having a terminal of the opposite polarity connected to said first bus, and means including the busses on said plates connecting the parallel connected diodes, capacitors and resistors on the plates in series.

2. A rectifier assembly comprising a relatively long, relatively narrow frame of electrical insulation, generally U-shaped in transverse section, said frame having transversely spaced apart legs with transversely extending longitudinally spaced apart slots therein, parallel plates of electrical insulation in said slots, each of said plates having a first metal bus attached to one side of the plate and extending adjacent to the edge of said plate nearest the bottom of said frame, having second and third, transversely aligned and spaced-apart metal busses attached to said one plate side adjacent to the opposite edge of said plate, each plate having a first semiconductor diode, a capacitor and a resistor extending between with their terminals connected to said first and second busses so as to be supported by and connected in parallel by said first and second busses, said first diode having a terminal of one polarity connected to said first bus, each plate having a second semiconductor diode, a second capacitor and a second resistor extending between with their terminals connected to said first and third busses so as to be supported by and connected in parallel by said first and third busses, said second diode having a terminal of the opposite polarity connected to said first bus, and means including the busses on said plates connecting the parallel connected diodes, capacitors and resistors in series.

3. A rectifier assembly as claimed in claim 2 in which clamps of electrical insulation are provided and attached to the ends of said legs and which extend over portions of said opposite edges of said plates and clamp said plates in said slots.

4. A rectifier assembly comprising a frame of electrical insulation, said frame having a pair of opposite side members, said side members having a plurality of spaced slots therein, the slots in one of said side members being opposite the slots in the said other side member, a plurality of plates of electrical insulation, said plates of electrical insulation being positioned transversely of said frame with the ends of said plates positioned in the slots in said side members in said frame, a semiconductor diode mounted on each of said plates of electrical insulation, spaced electrical conductors on said plates, said diodes being supported between the conductors, certain diodes on adjacent plates being inverted to have opposite polarities where connected to the conductors, and electrical means joining certain of said conductors for connecting all of said diodes in series circuit relationship.

5. A rectifier assembly comprising a frame of electrical insulation, said frame having a pair of opposite side members, said side members having a plurality of spaced slots therein, the slots in one of said side members being opposite the slots in said other side member, a plurality of plates of electrical insulation, said plates of electrical insulation being positioned transversely of said frame with the ends of said plates positioned in the slots in said side members in said frame, means clamping said plates of electrical insulation in said slots in said frame, a parallel circuit comprising a semiconductor diode, a capacitor and a resistor mounted on each of said parallel plates, spaced electrical conductors on said plates for supporting said diodes and capacitors and resistors between the conductors, certain diodes on adjacent plates being inverted to have opposite polarities where connected to the conductors, and electrical means joining certain of said conductors for connecting all of said parallel circuits in series circuit relationship.

6. A rectifier assembly comprising a frame of electrical insulation, said frame having a pair of opposite side members, said side members having a plurality of spaced slots therein, the slots in one of said side members being opposite the slots in said other side member, a plurality of plates of electrical insulation, said plates of electrical insulation being positioned transversely of said frame with the ends of said plates positioned in the slots in said side members in said frame, means clamping said plates of electrical insulation in said slots in said frame, a parallel circuit comprising a semiconductor diode, a capacitor and a resistor mounted on each of said parallel plates, spaced electrical conductors on said plates for supporting said diodes and capacitors and resistors between the conductors, certain diodes on adjacent plates being inverted to have opposite polarities where connected to the conductors, electrical means joining certain of said conductors for connecting all of said parallel circuits in series circuit relationship, and electrical terminal means connected to the ends of said series circuit.

7. A rectifier assembly comprising a frame of electrical insulation, said frame having a pair of opposite side members, said side members having a plurality of spaced slots therein, the slots in one of said side members being opposite the slots in said other side member, a plurality of plates of electrical insulation, said plates of electrical insulation being positioned transversely of said frame with the ends of said plates positioned in the slots in said side members in said frame, a plurality of parallel connected circuits mounted on each of said plates of insulation, each of said parallel circuits comprising a semiconductor diode, a capacitor and a resistor, spaced electrical conductors on said plates supporting the diodes and capacitors and resistors between the conductors and connecting the plurality of parallel circuits on each said plate in series circuit relationship on each plate, certain diodes on adjacent plates being inverted to have opposite polarities where connected to the conductors, and electrical means joining certain of the conductors for connecting all of the circuits on all of the plates in series circuit relationship.

References Cited in the file of this patent
UNITED STATES PATENTS

| | | |
|---|---|---|
| 2,515,638 | Doucette | July 18, 1950 |
| 2,832,013 | Pedersen et al. | Apr. 22, 1958 |
| 2,894,077 | McCoy | July 7, 1959 |
| 2,895,100 | Filberich et al. | July 14, 1959 |
| 2,931,003 | Huetten et al. | Mar. 29, 1960 |
| 2,951,185 | Buck | Aug. 30, 1960 |
| 2,958,014 | Blain | Oct. 25, 1960 |

OTHER REFERENCES

"Automatic Manufacture of Electronic Equipment" by L. P. Lessing, published by Scientific American, vol. 193, No. 2 (August, 1955), page 30 relied on.